United States Patent [19]

Bruno et al.

[11] Patent Number: 4,686,703
[45] Date of Patent: Aug. 11, 1987

[54] SYSTEM FOR BIDIRECTIONAL DIGITAL TRANSMISSION WITH ECHO CANCELLATION

[75] Inventors: Carlo M. Bruno, Gianfranco Panarotto, both of Turin; Adler Tofanelli, Collegno, all of Italy

[73] Assignee: Cselt-Centro Studi e Laboratori Telecommunicazioni S.p.A., Turin, Italy

[21] Appl. No.: 714,708

[22] Filed: Mar. 21, 1985

[30] Foreign Application Priority Data

Mar. 26, 1984 [IT] Italy ................................. 67285 A/84

[51] Int. Cl.⁴ ............................................. H04B 3/23
[52] U.S. Cl. ..................................... 379/410; 379/406; 370/32.1
[58] Field of Search ............... 179/170.2, 170.4, 170.6; 370/32, 32.1; 333/18; 379/410, 411, 406

[56] References Cited

U.S. PATENT DOCUMENTS

| | | | |
|---|---|---|---|
| 3,588,385 | 6/1971 | Moye | 370/32.1 |
| 4,131,767 | 12/1978 | Weinstein | 379/411 |
| 4,394,767 | 7/1983 | Shum | 375/13 |
| 4,539,674 | 9/1985 | Carlquist et al. | 370/32 |
| 4,539,675 | 9/1985 | Fisher | 370/32 |

OTHER PUBLICATIONS

"A New Approach for a Microprogrammed Echo Canceller", M. Copperi et al., Conference: Fifth International Conference on Digital Satellite Communications, Genoa, Italy, Mar. 23 through 26, 1981, pp. 259–264.
"Digital Echo Cancellation for Baseband Data Transmission", N. Verhoeckx et al., IEEE *Transactions on Acoustics, Speech and Signal Processing*, vol. ASSP 27, No. 6, Dec. 1979, pp. 768–782.
"Combining Echo Cancellation and Decision Feedback Equalization", K. Mueller, Bell System Technical Journal, vol. 58, No. 2, Feb. 1979, pp. 491–500.
"Echo Cancellation Techniques for Full–Duplex Data Transmission on Two-Wire Lines", D. D. Falconer et al. Bell Telephone Laboratories, pp. 83-1-7.

*Primary Examiner*—Gene Z. Rubinson
*Assistant Examiner*—R. Vaas
*Attorney, Agent, or Firm*—Karl F. Ross; Herbert Dubno

[57] ABSTRACT

A bidirectional transmission system with echo cancellation allows simultaneous interchange of digital information between an exchange and subscribers on a single transmission line. Data flows are transmitted by packets separated by short silence intervals within which clock signals are extracted and echo-cancellation adjustment is accomplished. Use of an adaptive equalizer and a single sampling operation per sampling period are possible.

12 Claims, 3 Drawing Figures

SYSTEM FOR BIDIRECTIONAL DIGITAL TRANSMISSION WITH ECHO CANCELLATION

FIELD OF THE INVENTION

Our present invention relates to the transmission of digital data and speech signals on a subscriber line and, more particularly, to a system for bidirectional digital transmission with echo cancellation.

BACKGROUND OF THE INVENTION

The introduction of low-cost high-density integrated circuits (VLSI) for PCM coding and decoding of speech signals has allowed direct digital transmission to and from a subscriber's telephone set. This enables both a higher quality of speech communication and a greater number of functions to be provided by the telephone line, such as data transmission and so on. Such transmission can be carried out, as in the traditional analog systems, by the simultaneous transmission of digital signals in both directions. The bandwidth occupied is maintained within acceptable values and the transmission line requires just two wires, so that existing subscriber lines, a coaxial cable, or an optical fiber can be used.

With this technique, the transmission directions are separated by an hybrid transformer which connects both the receiver and the transmitter to the line. An ideal hybrid balance and hence a complete separation between the two digital flows is however impossible to obtain.

In fact, the characteristics of existing telephone lines are different from the mean line characteristics for which the balancing network of the hybrid transformer is designed. The adjustment of the balancing network during its installation would be prohibitively expensive if it had to be carried out for each subscriber line.

Moreover the presence of possible signal reflections from impedance discontinuities along the line generates echo signals which cannot be eliminated by the hybrid balancing.

As a consequence, superposition of the two information flows occurs at the reception point, with a useful signal which can be less by various orders of magnitude than the disturbing echo signal ($\simeq -40$ dB). That makes a correct reception impossible, owing both to the degradation of the signal itself, and to the difficulty of extracting timing and synchronism information from the received data flow.

Hence the necessity of using the so-called echo cancellers, apt to eliminate the cross-talk between two digital flows at the receiving point. At the present two possible solutions are known for implementing the devices above. They are described in the paper entitled "Digital echo cancellation for baseband data transmission" N.A.M. Verhoeckx, et al *IEEE Transactions on Acoustics, Speech, Signal Processing*, Vol. ASSP-27-No.6, pages 768-781, December 1979.

The first solution requires several sampling operations per signalling period. An estimated echo-signal sample is subtracted from the obtained samples, so as to allow a faithful reconstruction of the useful signal by analog filtering. In a first phase, in which clock information is not available, cancellation takes place in an asynchronous way.

A phase locking between clocks of received and transmitted data is possible only when the reconstructed signal is considerably free of echo signal. The disadvantages of this technique are the high sampling rate needed to carry out numerous cancellations during the signalling period, and the impossibility of using automatic line equalizers. In fact the operation of these devices depends on received signal level, which in this case is altered by echo signal presence. Moreover systems of this kind cannot be fully integrated due to the presence of the imterpolator analog filter.

The second solution uses two samplings per signalling period. Once the two cancelling operations are over, a search is carried out for the optimal sampling phase by using suitable algorithms. Only after the canceller convergence is obtained, can the sampling phase be adjusted with respect to the clock of useful signal. Once the correction is effected, canceller convergence on the updated echo signal is awaited.

The disadvantage of this solution is that more cancellation cycles and phase adjustments are required to obtain optimal sampling instant, which entails a time loss while waiting for the attainment of the suitable conditions for correct communication. Moreover, two samplings per signalling period are required and hence the canceller operating rate is doubled. In this case too, insertion of an automatic equalizer is difficult.

OBJECT OF THE INVENTION

The object of our present invention, therefore, is to provide a bidirectional digital transmission with echo cancellation which allows the optimal sampling instant to be acquired and the correct decision at the receiving side to be obtained by a single sampling and cancelling operation per signalling period, without the necessity of analog receiving filters and with the possibility of using a suitable automatic equalizer.

SUMMARY OF THE INVENTION

The operating principle of the system resides in compressing data to be transmitted in packets separated by periods free from signals, whose durations are significantly less than packet duration.

At the expense of a low increment of symbol rate on the line, instants are made available in which at the receiving side there is the presence of the echo signal alone, of the useful signal alone or of both. By exploitation of these particular time intervals, synchronism signals are extracted within the period in which the echo is absent, and the automatic line equalizer is adjusted. The canceller is quickly adjusted when the echo signal alone is present, since the echo signal is not "disturbed" by the useful signal. Besides packet transmission allows frame alignment without the addition of redundancy to the digital flow, since it uses leading edges of the packets as frame synchronism markers.

A typical ratio of silence period to transmission period can amount to about 20%.

BRIEF DESCRIPTION OF THE DRAWING

The above and other objects, features and advantages of the present invention will become more readily apparent from the following description, reference being made to the accompaning drawing in which.

SPECIFIC DESCRIPTION

Figure 1:
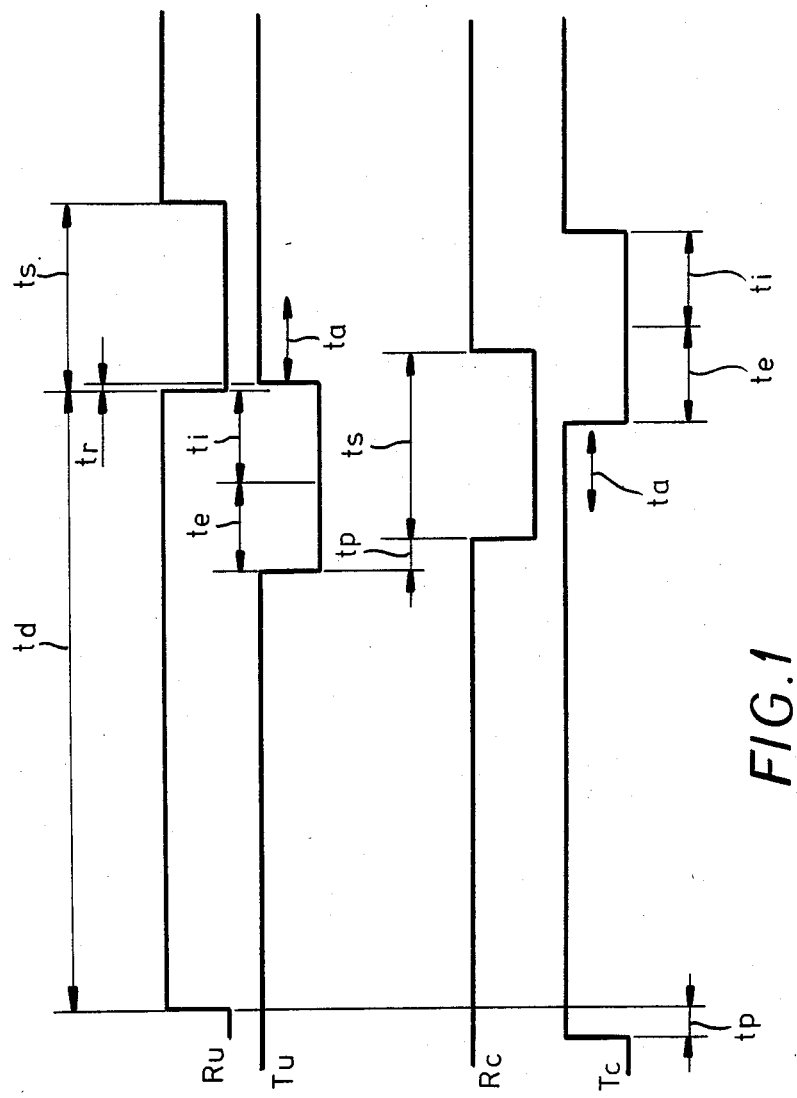
FIG. 1 is a timing diagram of the operations of data reception and transmission.

FIG. 1 shows timing diagrams of a cycle of transmitting and receiving operations, both at the subscriber's end and at the exchange. More particularly, as long as the transmission lasts, there is a succession of these cycles composed of a time interval td for data followed by a time interval ts without data.

In FIG. 1 Tc denotes the digital flow transmitted by the exchange, and Ru the same flow received at the input of the subscriber's receiver, after a delay tp due to the propagation time along the line. At the same time, Tu˙ denotes the digital flow sent by the subscriber's terminal and Rc the same flow present at the exchange after the line delay tp.

The operating principle of the apparatus of the invention requires a silence interval ts given by the following relation;

$$ts > ti + te \qquad (1)$$

where
- ti denotes the period in which the presence of only the useful signal without echo is requested both at the exchange and at the subscriber's end;
- te denotes the maximum time necessary for the extinction of the echo signal and is a value derived from statistical observations on the lines.

Moreover, te is chosen according to the following relation:

$$te > p\ 2tp + tr \qquad (2)$$

where tr denotes the time the subscriber's apparatus requires to recognize the end of reception period td and consequently to start a transmission period; expression (2) ensures the presence of data at the exchange side within the whole interval ti. This expression has to be observed, as the time relations between flows Ru and Tu and flows Rc and Tc are different due to line propagation time.

In fact, while at the subscriber's end the receiving period end and the transmitting period beginning are separated by a fixed time interval tr, which only depends on the system characteristics, at the exchange end the transmitting period end and the receiving period beginning are separated by a time interval which is a function of the line length.

Since this magnitude is generally unknown, relation (2) invariably ensures the correct system operation.

In the interval ta, which at the subscriber's terminal is found at the beginning of period td, while at the exchange terminal is found at the end of the same period td, only the echo signal is present at the reception point. A correct operation of the exchange terminal requires ta be chosen according to the following relation;

$$ta < ts - 2tp - tr \qquad (3)$$

further to which only the echo signal is present at the receiving side of the terminal.

Analogously, for the subscriber's terminal relation (3) becomes:

$$ta < ts - tr \qquad (3)$$

The operating procedure upon which the system is based is the following. The first transmitting operation is always effected by the exchange terminal. This operation begins with a sequence of periods td, ts, from which the subscriber's terminal effects clock extraction, acquisition of optimal sampling phase and frame alignment.

Then the subscriber's terminal, at the end of receiving period td, begins its own transmitting cycle. At that instant, time relations, relevant to periods te, ti and ta, are known at the subscriber's terminal. These relations allow the subscriber's terminal to keep frame alignment and optimal sampling phase by using interval ti; besides in the interval ta the echo estimate can be very accurately updated, as the echo signal is not "disturbed" by the useful signal.

At the exchange the beginning of data packet sent by a subscriber falls within period ts, free from data transmitted by the exchange. In this way the exchange can easily extract within period ti the frame information and the optimal phase for sampling the signal received.

At this instant, interval ta is also known at the exchange side: as a consequence the echo canceller can be accurately updated within said interval.

Figure 2:
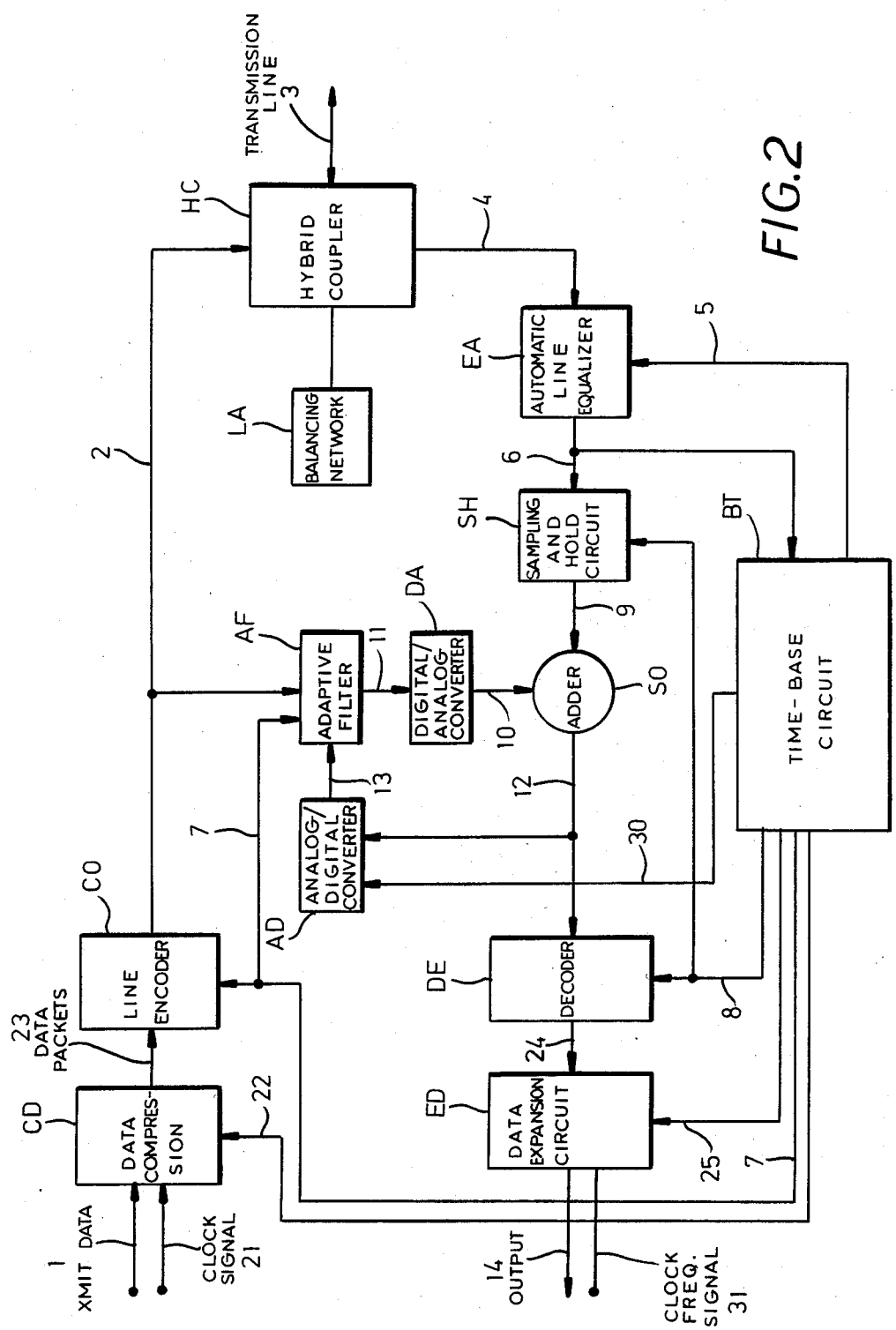
FIG. 2 is a block diagram of the system provided by the invention.

FIG. 2 is a block diagram of the system. Continuous data flow to be sent on transmission line 3 arrives through wire 1, and the respective clock signal arrives through wire 21. They access a circuit CD, apt to compress data into packets with a duration equal to td (FIG. 1) separated by silence intervals whose duration is equal to ts (FIG.1). Data are stored in suitable registers contained in CD, at the frequency of the clock signal present on wire 21, and are sent to the output over wire 23 at a higher frequency, established by the signal present on wire 22. Packets thus obtained access a block C0 where they are duly coded with the desired line code.

Thanks to transmission technique characteristics two- or three-level codes can be used as desired. In case more levels are required, the automatic line equalizer, denoted by EA, and decision and decoding block DE are designed with this in mind.

Coded data, present on wire 2, are sent at the same time to hybrid coupler HC and echo adaptive filter AF.

Through the hybrid coupler HC the signal to be transmitted is partly sent onto the wire pair represented by line 3, partly to the balancing network LA and, owing to unavoidable unbalance and reflections, along the line, to wire 4 connected to the input of the receiving end. Also the useful signal is present on wire 4, according to the time relations shown in FIG. 1.

Automatic equalizer EA is enabled by the signal present on wire 5 to adapt according to the characteristics of transmission line 3. The signal present on wire 5 is supplied by a time-base circuit BT only within period ti (FIG. 1). Equalizer EA can accurately estimate transmission characteristics of line 3, since only the useful free-of-echo signal is present during period ti.

For the remaining time, to the next interval ti, the equalizer keeps its characteristics unchanged. On wire 6 there are present both the useful equalized signal and the echo signal. In period ti there is the useful signal alone, which is used by the time-base circuit BT to generate:
- on wire 7 synchronism signals for encoder C0 and canceller EC;
- on wire 8 synchronism signals for the decoder DE and for the acquisition of the symbol received by a sampling circuit SH;
- on wire 5 the previously mentioned enabling signal for automatic equalizer EA:

on wire 22 the signal for compressing into data packets the continuous flow at the input of circuit CD;

on wire 25 the signal for expanding data packets into a continuous flow at the output for a circuit ED; and on wire 30 the enabling signal for a circuit AD.

Transmission clock signals, available on wire 7, are active only in presence of valid data, i.e. during periods td of flows Tc and Tu (FIG. 1). Analogously on wire 8 reception clock signals are active and available only during periods td of flows Rc and Ru (FIG. 1).

The signal equalized by EA is sent through wire 6 to sampling circuit SH and to time-base circuit BT, which uses it in period ti (FIG. 1) to extract synchronism signals.

In sampling-and-hold circuit SH the equalized signal is sampled only once at the optimal instant, upon command of circuit BT, and the value obtained is kept memorized (held) during the whole signalling period. Then on the output wire 9 there is a signal reproducing the useful signal at discrete instants. This signal is sent to an adder SO, which subtracts it only once per signalling period from the signal present on wire 10.

This latter signal is generated by a digital-to-analog converter DA, which utilizes the estimated echo signal supplied through wire 11 by adaptive filter AF.

At the output of adder SO, on wire 12, there is the difference signal which is converted into digital form by analog-to-digital converter AD. This circuit is enabled by the signal present on wire 30 only within period ta (FIG. 1), in which the echo signal alone is present. The digital signal supplied on wire 13 is used in accordance with cancellation algorithm, on which the operating principle of block AF is based, to generate the estimated echo signal on wire 11. Adaptive filter AF is enabled in the period td alone (FIG. 1) by the signal on wire 7: in fact data are present at the receiving side within such a period.

Adaptive filter AF can be conventionally built up, e.g. with a scheme similar to one of those described in "Echo cancellation techniques for full-duplex data transmission on two wire lines", D.D. Falconer et al. *NTC.76 Proceedings*—29, 30 Nov.—1 Dec. 1976—Dallas, Vol. 1, pages 8.3-1, 8.3-7, and "Combining echo cancellation and decision feedback equalization", K.H. Mueller—*The Bell System Technical Journal*—February 1979, pages 491-500.

After an initial transient, from the instant when data are beginning to be received, adaptive filter AF can correctly estimate the echo signal, adjusting itself to the transmissive characteristics of line 3 and of hybrid coupler HC.

The signal on wire 12 is then sent to decoder DE, which, upon command of the signal on wire 8 arriving from time-base circuit BT, supplies it in binary form to the output wire 24.

Finally this signal, formed by packets separated by silence intervals, is sent to an expansion circuit ED. Data expansion circuit ED consists of suitable registers, apt to store at the frequency of the signal on wire 25 the packets present on wire 24 and to supply them on output wire 14 at a frequency determined by the signal on wire 31, arriving from terminal devices placed outside the system.

Figure 3:
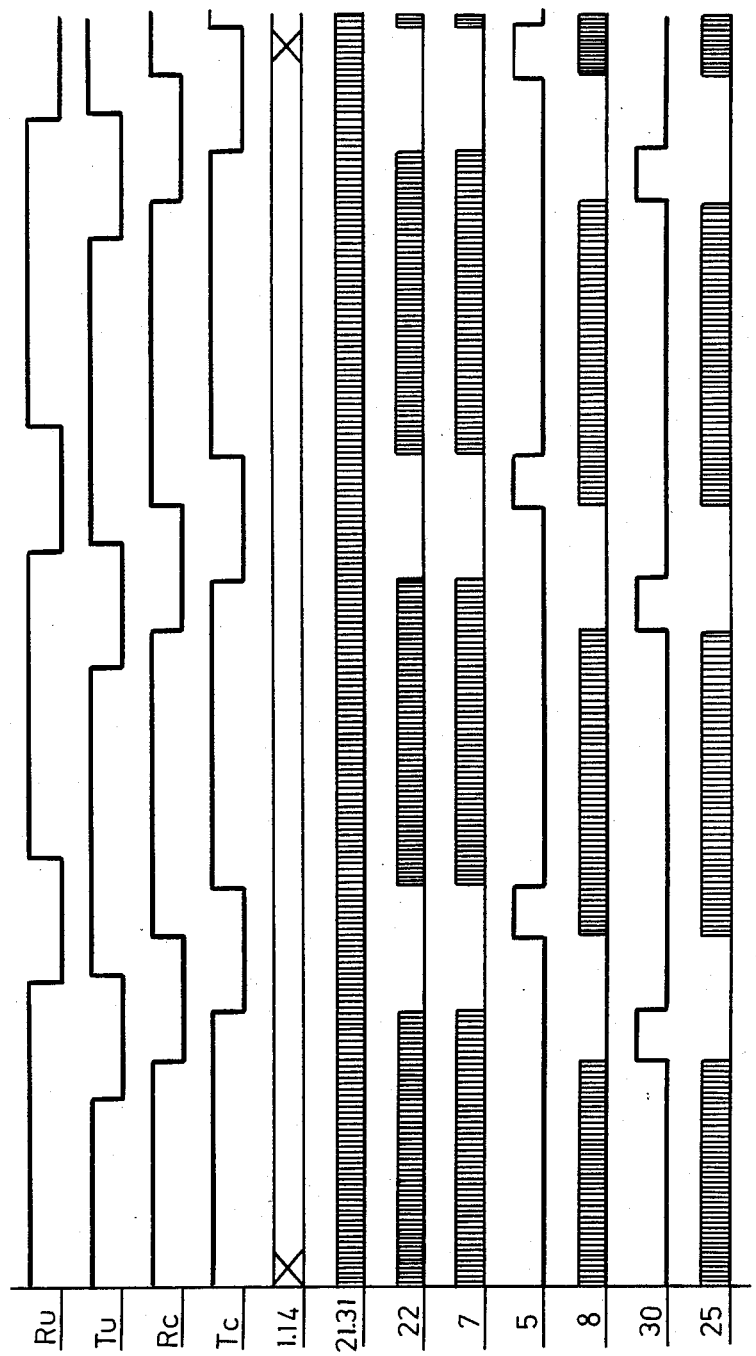
FIG. 3 is a timing diagram of signals emitted by the block denoted by BT in FIG. 1.

FIG. 3 shows the signals generated by time-base circuit BT (FIG. 2). For a better understanding the flows denoted by Ru, Tu, Rc, and Tc in FIG. 1 are also shown.

Under the hypothesis that the present apparatus be installed in the exchange, flow Rc is present on wire 12 in line code and on wire 24 in binary code. Analogously, flow Tc is present on wire 23 in binary code and on wire 2 in line code.

References 1, 14 denote continuous data flows present on homonymous wires at the system input and output. They appear with their clock signals on wires 21 and 31, respectively. These signals may be supposed to have a frequency of 144 Khz.

Reference 22 denotes the signal used to compress the continuous data flow. Its frequency is equal to that of the clock signal, multiplied by quantity (td+ts)/td. In this example, with ts=td.20/100, signal 22 has a frequency of nearly 173 kHz and is active when data are transmitted by the exchange, within period Tc.

The signal on wire 7 is also active during the same periods, but in case of an encoding with passage from a two-level to a three-level code, its frequency is lower. E.g., by an encoding of 4B-3T type, the frequency of said signal on wire 7 is about 128 kHz, owing to higher information contents of transmitted symbols.

Signal 5 is active on the homonymous wire only during intervals ti (FIG. 1) when at the receiving side there is certainly only the useful free-of-echo signal.

Signal denoted by 8 has the same frequency as that of received-packet clock, namely in this case 128 kHz, and is active when there are data received in period Rc.

Signal 30 is active on the homonymous wire only during intervals ta (FIG. 1), when at the receiving side there is certainly only the echo signal.

Finally, 25 denotes the clock signal of binary data arranged in packets. It has a frequency equal to about 173 kHz and is active when there are data received during period Rc.

It is clear that the invention has been described only by way of a nonlimiting example Variations and modification to the above embodiments may of course be made without departing from the scope of the invention.

We claim:

1. In a digital bidirectional transmission system with echo cancellation, between a transmission exchange and a subscriber station interconnected by a single transmission line, said transmission system comprising:

an encoder for encoding in line code a first data signal an an input thereof;

a hybrid coupler for transferring to said transmission line a second signal supplied by said encoder and for transferring from said transmission line a third signal to be received, said hybrid coupler being connected to a balancing network and having a received-signal output terminal;

a sampling circuit for sampling through said received-signal output terminal said third signal received by said hybrid coupler from said transmission line;

adaptive filter means for supplying an estimated echo signal correlated both to an encoded data signal; from said encoder and to a digital signal supplied by an analog-to-digital converter;

an adder for subtracting a fourth signal supplied by said sampling circuit from a fifth signal supplied by a digital-to-analog converter, said digital-to-analog converter being coupled to said adaptive filter, said adder forming a difference signal representing the subtraction of said fourth signal from said fifth signal at an output of said adder, said difference signal being sent to said analog-to-digital converter and to a decoder, said decoder supplying at an output thereof a decoded signal which is arranged in packets; and a time-base circuit, the improvement which comprises:

a compressing circuit for compressing continuous data flow at a data input into packets with a first duraction (td) separated by silence intervals of a second duration (ts), and for supplying the packets compressed by said compressing circuit to said encoder, a first clock signal being supplied at said data input from an outside source and a second clock signal for compression being supplied to said compressing circuit from said time-base circuit, said second clock signal having a frequency higher than that of said first clock signal and being active during said first duration, means whereby said analog-to-digital converter is enabled by a signal from said time-base circuit active during reception when an echo signal alone is present, means whereby said sampling circuit is enabled for sampling and storing operations once per signalling period by a signal supplied by said time-base circuit when valid data are present, and an expansion circuit for expanding the flow of packets arriving from said decoder into a continuous data flow which appears at an output of said expansion circuit, a third clock signal being supplied by said time-base circuit to an input of said decoder and being active when valid data are Present during reception, and a fourth clock signal being supplied by said time-base circuit to an input of said expansion circuit.

2. The improvement defined in claim 1, further comprising:

an adaptive equalizer connected to a received-signal output terminal;

means for applying from said time-base circuit to said adaptive equalizer a signal enabling said adaptive equalizer within a third duration (ti) during which only a free-of-echo signal appears at said received-signal output terminal; and means for delivering an equalized signal appearing at an output of said adaptive equalizer to both said sampling circuit and to said time-base circuit.

3. The improvement defined in claim 2 wherein said second duration (ts) exceeds the sum of said third duration (ti) and a maximum extinction time (te) of an echo signal carried over said transmission line.

4. The improvement defined in claim 3 wherein said transmission line has a propagation time (tp), said propagation time being less than half of a difference between said maximum extinction time (te) and a time (tr) in which the subscriber station recognizes the end of a receiving period (td).

5. The improvement defined in claim 4 wherein said signal from said time-base circuit active during reception when an echo signal alone is present, is active at the exchange during a time interval (ta) less than said second duration (ts) minus twice the propagation time (tp) and minus the time (tr) in which the subscriber station recognizes the end of the receiving period.

6. The improvement defined in claim 5 wherein said signal from said time-base circuit active during reception when an echo signal alone is present, is active at the exchange during a time interval (ta) less than said second duration (ts) minus the time (tr) in which the subscriber station recognizes the end of the receiving period.

7. A digital bidirectional transmission system with echo cancellation for a transmission line, comprising:

compressing means for compressing data at an input of said compressing means into packets with a first duration, separated by silence intervals with a second duration;

encoding means coupled to said compressing means for encoding in line code data from an output of said compressing means;

hybrid means coupled to said encoding means and coupled to said transmission line for transferring said line code data to said transmission line and for transferring from said transmission line data received from said transmission line;

balancing means coupled to said hybrid means to compensate for reflections generated on said transmission line;

adaptive filtering means coupled to said encoding means for generating an estimated echo signal;

first converting means coupled to said adaptive filtering neans for converting said estimated echo signal into analog signals;

sampling means having an input coupled to an output of said hybrid means for sampling and storing an output of said hybrid means;

combining means coupled to said first converting means and said sampling means for subtracting an output of said sampling means from an output of said first converting means;

second converting means coupled to an output of said combining means and to said adaptive filtering means, for converting an output of said combining means into digital signals and inputting said digital signals to said adaptive filtering means;

decoding means coupled to said output of said combining means to generate signals arranged in packets;

expanding means coupled to an output of said decoding means for expanding the packets of signals received therefrom; and timing means coupled to said second converting means, compressing means, encoding means, decoding means, expanding means and sampling means for supplying respective enabling signals thereto, so that said sampling means is enabled by said timing means to sample said output of said hybrid means once per unit of time.

8. A system as defined in claim 7, further comprising adaptive equalizing means inserted between said output of said hybrid means, and said input of said sampling means, and coupled to said timing means to compensate for transmission characteristics of said transmission line upon receipt of a respective enabling signal from said timing means.

9. A system as defined in claim 8 whereby said second duration exceeds the sum of a first time interval and a second time interval, said first time interval being a period in which only a useful free-of-echo signal is present at a receiving side and said second time interval is a maximum extinction time of an echo signal.

10. A system as defined in claim 9 whereby said transmission line has a propagation time which is less than one half the difference of said second interval and a third interval whereby said third interval is a time in which a receiving side of the system recognizes the end of said first duration.

11. A system as defined in claim 10 whereby said second converting means is supplied with an enabling signal by said timing means which is active only during reception when said echo signal is present during a fourth interval less than said second duration minus twice said propagation time and minus said third interval.

12. A system as defined in claim 10 whereby said second converting means is supplied with an enabling signal from said timing means which is only active during reception only when said echo signal is present over a fifth interval which is less than said second duration minus said third interval.

* * * * *